Aug. 9, 1949.  P. ORR  2,478,306
HYDRODYNAMIC COUPLING
Filed March 1, 1947
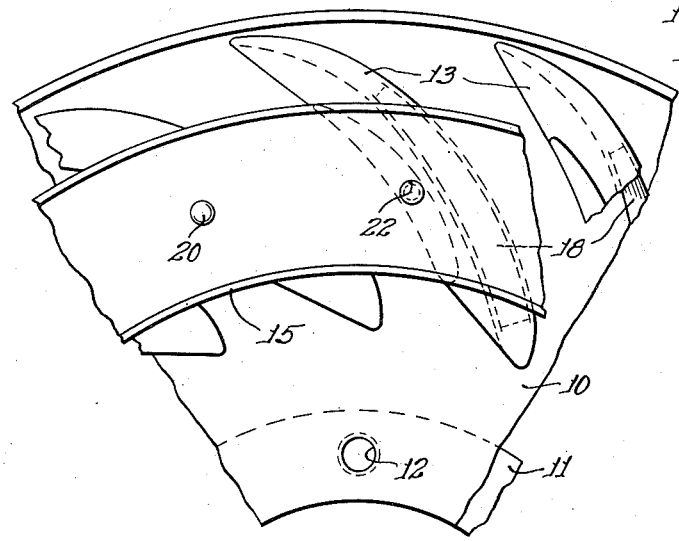
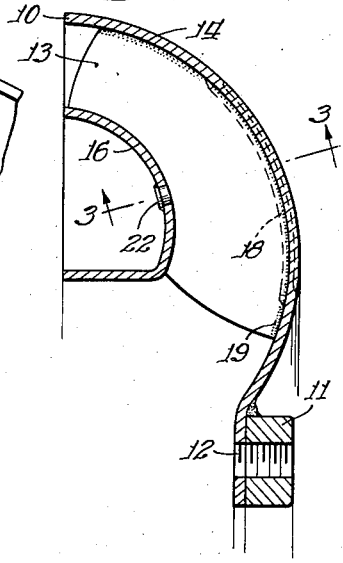
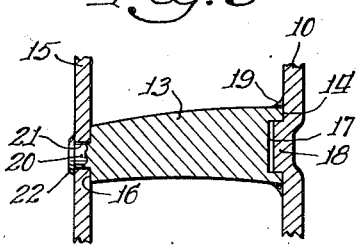
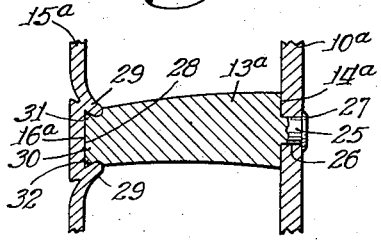
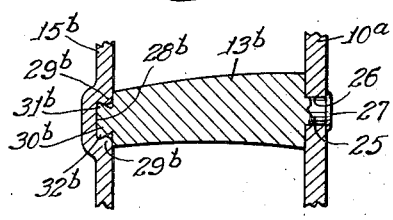
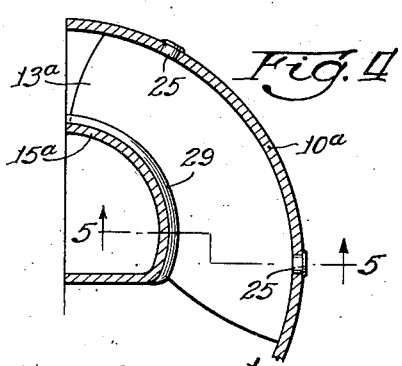
Inventor:
Palmer Orr Patented Aug. 9, 1949

2,478,306

UNITED STATES PATENT OFFICE 2,478,306

HYDRODYNAMIC COUPLING

Palmer Orr, Muncie, Ind., assignor to Borg-Warner Corporation, Chicago, Ill., a corporation of Illinois Application March 1, 1947, Serial No. 731,807

5 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned elements including a driving element and a driven element, the drive between which is through a body of liquid. The vanes of these elements impart energy to and receive energy from the body of liquid. A fluid coupling which is not intended to multiply torque generally includes only two such elements while a hydrodynamic torque converter for multiplying torque includes at least three vaned elements, a stator element which has a reaction force impressed thereon by the fluid and is held from rotation being the third element. Such hydrodynamic torque converters are shown, for example, in Schneider et al. Patent No. 2,306,758 and Schneider et al. Patent No. 2,333,680.

Considerable difficulty has been experienced in the past in assembling these hydrodynamic coupling devices and in particular these devices of the torque converter type. The vanes in the driving and driven elements of the non-torque converting type are generally flat pieces of metal; however, the vanes in the elements of a torque-converting hydrodynamic device generally are curved and are of substantial thickness and differ in thickness throughout their length and breadth. This being so, the vanes in the former type of coupling are more easily attached to the elements of the coupling than are the vanes in the latter type of coupling. The vanes in a driving or driven element of a non-torque converting hydrodynamic coupling are in general disposed radially of the elements of the coupling and are therefore relatively easy to properly position. The vanes in a torque converting hydrodynamic coupling, on the other hand, are located at skew angles with respect to radial planes in the coupling element, and these vanes are thus more difficult to position in their proper locations.

It is an object of my invention to provide an improved arrangement and method for locating and fixing the vanes to the casing member of a hydrodynamic coupling device. More particularly, it is an object of the invention to provide recesses in the casing member and bosses on the edges of the vanes adapted to fit in the recesses and so locate the vanes with respect to the casing member.

More particularly, it is an object of the invention to provide such recesses and bosses which are so arranged as to form a snap connection between the vanes and casing member so that when the bosses are fitted in the recesses to locate the vanes, the bosses and recesses have overlapping portions which prevent removal of the vanes from the casing member unless a substantial force is applied.

The invention consists of the novel constructions, arrangements, devices, processes and methods to be hereinafter described and claimed for carrying out the above stated objects and such other objects as will appear from the following description of certain preferred embodiments of the invention and the methods for making the same illustrated in the accompanying drawing, wherein:

Fig. 1 is a cross-sectional view of a portion of an impeller or driving element of a hydrodynamic torque converter embodying the principles of the invention;

Fig. 2 is an elevational view of the impeller as seen from the left in Fig. 1 or from the inner side of the impeller;

Fig. 3 is a sectional view on an enlarged scale taken on line 3—3 of Fig. 1 in the direction indicated;

Fig. 4 is similar to Fig. 1 and is a cross-sectional view of a portion of an impeller embodying a modification of the invention;

Fig. 5 is a sectional view on an enlarged scale taken on line 5—5 of Fig. 4; and Fig. 6 is a view similar to Figs. 3 and 5, but of another modification of the invention.

Like characters of reference designate like parts in the several views.

Referring now to the drawing, and in particular to Figs. 1, 2 and 3, the illustrated impeller element may be seen to comprise an outer casing member or shell 10 which is provided with a hub portion 11 having holes 12 therethrough for attachment to a suitable hub (not shown). The casing member 10 has a plurality of vanes 13 disposed in equally spaced relation therein, and the vanes are in contact with the casing member 10 on base edges 14 thereof. An inner casing member or core ring 15 is disposed within and spaced from the casing member 10, and the core ring is in contact with edges 16 of the vanes which are opposite the vane edges 14.

It will be understood that the casing member 10 and the core ring 15 are both annular and are complete rings although only portions of the casing member and core ring are illustrated in the drawing. The vanes 13 are equally spaced and extend completely around the casing member and core ring. It will be noted that the vanes 13 are curved and have a varying and substantial thickness, and the vanes are of such form that the illustrated hydrodynamic coupling element is adapted to constitute an impeller in a hydrodynamic torque converter, such as is, for example, shown in the two Schneider patents hereinbefore mentioned. It will be understood that the illustrated impeller element is adapted to be used in connection with a vaned driven element and a vaned stator element, which constitute the three elements ordinarily found in a hydrodynamic torque converter, with the impeller element functioning to impart energy to a body of liquid in the torque converter, the driven or runner element receiving energy from the liquid and the stator element being held from rotation and functioning as a reaction element to change the direction of flow of the liquid such that the converter functions to multiply the torque.

Each of the vanes 13 is provided with a recess 17 in its base edge 14, and the outer casing 10 is provided with a boss 18 which extends into the recess. The vane 13 is properly located in the member 10 by the recess and boss and is fixed in this position by being welded to the outer casing member, as at 19. The vanes 13 may be formed of some light metal, such as, for example, aluminum and the recesses 17 may simply be cast in the vanes. The outer casing member 10, as well as the inner core 15, is preferably of sheet steel, and the bosses 18 may simply be punched into the casing member with use of any suitable dies.

It will be understood that the casing member 10 is provided with as many bosses 18 as there are vanes 13, and the bosses are equally spaced around the casing member 10 and are at the correct angle with respect to imaginary radial planes through the casing member to properly position the vanes in the casing member at the correct skew angles in which they are shown.

Each of the vanes 13 is provided on its inner end with an integrally formed rivet 20 which extends through an opening 21 in the core ring 15, and the rivet is headed over as at 22 to fix the core ring with respect to the vane. The core ring 15 and casing member 10 are thus held together in spaced relation by the vanes 13 which are welded to the casing member 10 and are riveted to the core ring.

In making the coupling element, the outer casing member 10 and the core ring 15 are first stamped out, and the bosses 18 and the openings 21 are stamped into the casing member and core ring by means of suitable dies. The vanes 13 are cast from a light material such as aluminum, with the recesses 17 in their base edges 14, and the vanes are located within the outer shell 10, with the bases 18 extending into the recesses 17. After being located, the vanes are welded to the shell 10, as at 19. The vanes 13 are also cast with the rivets 20 on their inner edges 16, and in fixing the core ring 15 with respect to the vanes and the outer shell 10, the core ring is fitted to the vanes with the rivets 20 extending through the openings 21. The rivets are then headed over as at 22, and the assembly is complete.

The embodiment of the invention shown in Figs. 4 and 5 is quite similar to that shown in Figs. 1, 2, and 3, with the principal exception being that the vanes are attached to the outer shell by means of rivets and are attached to the inner core ring by means of a snap recess and boss connection of generally dovetail configuration. In this embodiment, the vanes 13a are cast with rivets 25 which extend through openings 26 in the outer casing member 10a, and these rivets are headed over at 27 in order to fix the vanes to the outer casing member. The core ring 15a is provided with a recess 28 for each of the vanes, which is defined by lips 29 formed inwardly out of the plane of the core ring 15a. Each of the vanes 13a is provided with a boss 30 of generally dovetail design, the boss having outwardly flaring sides 31 and 32. The over-all thickness of the vanes 13a in the boss regions thereof is greater than the distance between the lips 29. These lips overlie the sides 31 and 32 of the dovetail boss when the vane is in position, so that in order to position the boss 30 in the recess 28, the vane must be moved into the recess with a substantial force with some deformation of the parts, and a corresponding force is necessary in order to remove the vane from the recess. The bosses 30 and recesses 28 bounded by the lips 29 thus constitute snap connections which not only correctly locate the core ring 15a and vanes 13a with respect to each other but which also fixes them in their correctly located positions.

This embodiment of the invention is made by first stamping out the shells 10a and 15a, suitable dies being utilized for forming the lips 29 and the openings 26. The vanes 13a may be cast with the bosses 30 on one end and the rivets 25 on the other. The vanes 13a are located with respect to the core ring 15a by forcing the bosses 30 into the recesses 28, and the vanes are located with respect to the outer casing 10a by positioning the rivets 25 in the openings 26. As has been described, the bosses 28 and recesses 30 constitute a snap connection which functions to fix the inner core 15a and vanes 13a together, and the rivets 25 are headed over at 27 to fix the outer casing member 10a with respect to the vanes and inner core 15a.

The embodiment of the invention illustrated in Fig. 6 is quite similar to that shown in Figs. 4 and 5 with the exception that the recesses 28 are formed in a somewhat different manner. The vanes 13b are fastened with respect to the outer casing member 10a by means of the rivets 25, which is like the arrangement for fastening the vanes and outer casing member shown in Figs. 4 and 5. The core ring 15b in the Fig. 6 construction is provided with dovetail recesses 28b defined at its edges by lips 29b, and these recesses differ from those in the embodiment shown in Figs. 4 and 5 in that the lips 29b are in the plane of the core ring 15b rather than out of the plane of the core ring. The recesses 28b are also formed by means of dies, and the dovetail bosses 30b and recesses 28b form a snap connection between the vanes 13b and the inner core 15b similar to the snap connection in the embodiment shown in Figs. 4 and 5. The bosses 30b have tapered sides 31b and 32b. The over-all thickness of the vanes 13b in the boss regions thereof is greater than the distances between the lips 29b, so that these lips overlie the boss portions 31b and 32b. The embodiment of the invention shown in Fig. 6 is assembled similarly to the embodiment shown in Figs. 4 and 5.

The bosses and recesses shown in the above described embodiments of the invention effectively position the vanes with respect to an adjacent casing member. The snap connections formed by the undercut bosses and recessses furthermore function not only to correctly locate the vanes with respect to a casing member, but also effectively fix and form the sole support for the vanes with respect to the casing member, as has been described.

I wish it to be understood that my invention is not to be limited to the specific constructions of hydrodynamic couplings or to the specific methods for making the same which are shown and described, except only insofar as the claims may be so limited, as it will be apparent to those skilled in the art that changes may be made without departing from the principles of the invention. In particular, I wish it to be understood that the invention is not to be limited to torque converting couplings to the exclusion of non-torque converting couplings unless the claims are so limited. Furthermore, I wish it to be understood that, although the invention is illustrated in connection with an impeller element of a hydrodynamic coupling device, the same arrangement and method disclosed herein for locating the blades and fixing them may be used with the other vaned elements of a hydrodynamic coupling, and I do not intend to limit my invention to any particular vaned element of a hydrodynamic coupling, unless the claims are so limited.

I claim:

1. In a vaned hydrodynamic coupling element, the combination of a hollow casing member, a plurality of spaced vanes fitting in said casing member, a ring-like core member fitting on said vanes and spaced from said casing member, means for fixing said vanes with respect to one of said members, and a snap connection for locating each of said vanes with respect to the other member and fixing it with respect to the latter and including a dovetail boss formed on the vane and fitting in a dovetail recess formed in the latter member, said recess being formed by flexible converging lips overlying inclined side portions of said boss whereby removal of said vanes from the member may be effected by the application of lateral thrust to said vanes.

2. In a vaned hydrodynamic coupling element, the combination of a vane-supporting member, a vane adapted to fit on said member, and means for locating said vane on said member and including a boss formed on said vane and fitting in a recess formed in said member, said recess being formed by a portion depressed out of the plane of the member and lips on the edges of said portion in the plane of the member and overlying portions of said boss.

3. In a vaned hydrodynamic coupling element, the combination of a hollow casing member, a plurality of spaced vanes fitting in said casing member, a ring-like core member fitting on said vanes and spaced from said casing member, and a snap connection for locating each of said vanes with respect to one of said members and fixing it thereto and including a boss formed on the vane and fitting in a recess formed in said latter member, said recess being defined by a portion depressed out of the plane of the member and lips at the edges of the depressed portion and in the plane of the member and overlying portions of said boss.

4. In a hydrodynamic coupling element, the combination of a hollow casing formed of relatively thin sheet material, a plurality of vanes within said member, said vanes having one edge thereof of materially greater thickness than the thickness of the metal of said casing member, means for locating and securing said vanes in said casing member comprising a boss defined by an offset portion of said casing and of a width materially greater than the thickness of the metal of the casing and of less width than the thickness of the edge of a vane, there being a recess in the edge of each vane substantially equal to the width of each boss, said bosses each fitting into a recess of a respective vane edge and serving to locate and fix the vane with respect to said casing, and additional means for securing said vanes in position in said casing.

5. In a vaned hydrodynamic coupling element, the combination of a vane-supporting and -spacing member formed of sheet metal, said member having a plurality of dovetail vane-supporting recesses formed therein, the metal of said member in the vicinity of each recess being bent out of its normal plane on each side of the recess and being reversed upon itself to provide a pair of outwardly converging lips defining therebetween the dovetail recess and a flat bottom therefor and a dovetail boss formed on each vane fitting within a respective recess.

PALMER ORR.

REFERENCES CITED

The following references are of record in the file of this patent:

UNITED STATES PATENTS

| Number | Name | Date |
| --- | --- | --- |
| 1,347,327 | Dickinson | July 20, 1920 |
| 1,648,026 | Murray | Nov. 8, 1927 |
| 1,649,409 | Jardine | Nov. 15, 1927 |
| 1,837,706 | Ferguson | Dec. 22, 1931 |
| 1,916,175 | Lysholm | June 27, 1933 |
| 2,162,902 | Adams | June 20, 1939 |
| 2,224,664 | Bierend | Dec. 10, 1940 |
| 2,402,204 | Phelan | June 18, 1946 |

FOREIGN PATENTS

| Number | Country | Date |
| --- | --- | --- |
| 557,728 | Germany | Aug. 27, 1944 |